July 9, 1963 W. F. MUELLER 3,096,582
CHEESE CUTTER
Filed Aug. 10, 1961
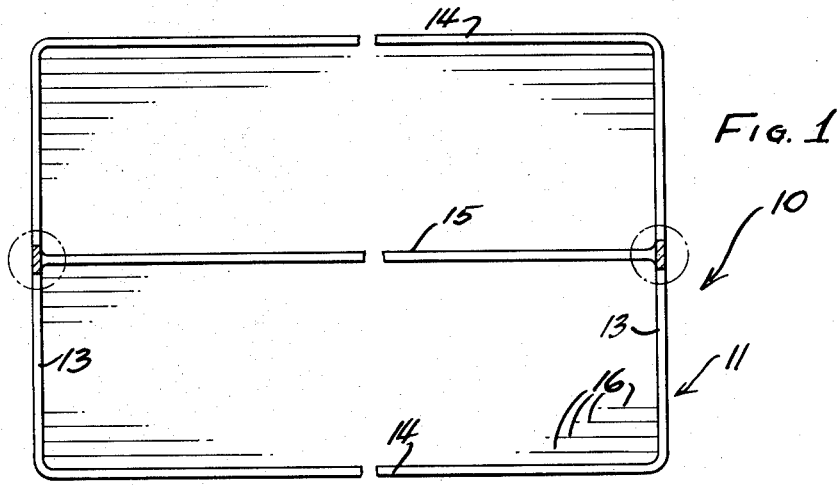
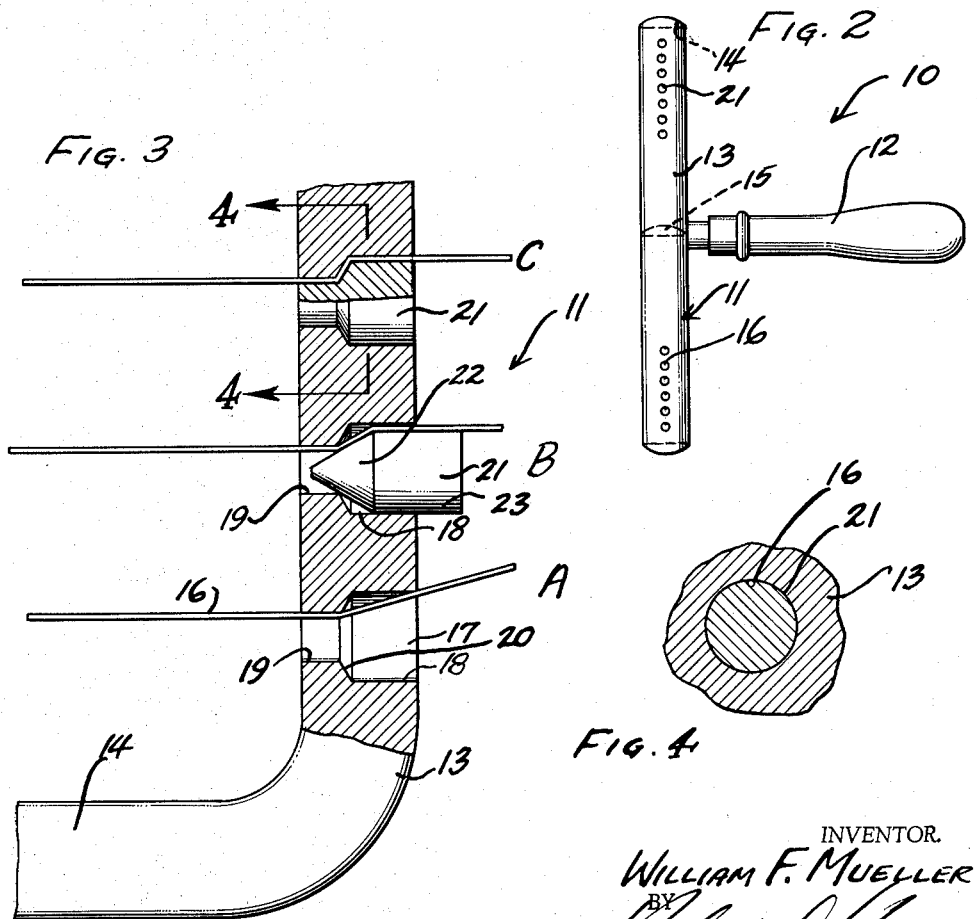
INVENTOR.
WILLIAM F. MUELLER United States Patent Office 3,096,582
Patented July 9, 1963

3,096,582
CHEESE CUTTER
William F. Mueller, 5405 Aura Ave., Tarzana, Calif.
Filed Aug. 10, 1961, Ser. No. 130,628
3 Claims. (Cl. 31—23)

The present invention relates to apparatus useful in the manufacture of cheese and more specifically, to a cheese cutter specifically intended for use in cutting the curd in the manufacture of soft cheeses, such as for example, cottage cheese.

Cottage cheese is manufactured by subjecting pasteurized skim milk to a lactic acid starter or rennet or any other coagulant. After coagulation of the curd—the casein—which takes approximately five to five and one-half hours after the introduction of the starter culture and rennet, the curd is cut. After the cutting operation, the entire batch is cooked with steam for a pre-determined length of time, after which the whey is drained off and the curd subsequently rinsed, the initial rinse being with ordinary tap water and the last rinse preferably with ice water. After the rinse procedures, the curd is ready to be used in the manner intended.

Present day cheese cutters comprise a frame or bow with cutting wires strung between opposite sides of the bow, the frame and the wires, of course, being formed of some sanitary material, such as for example, stainless steel. Since the cutting wires are strung between opposite sides of the bow, the wire is initially preferably a continuous length strung tautly around suitable lips formed on the respective sides of the frame, the wire, of course, being necessarily of that size which will permit the ready stringing of the frame or bow. These present cutters have certain inherent disadvantages, the first being that the lips on the respective sides of the frame over which the wires are strung present a sanitary problem since they act as a trap or recepticle for cheese and are difficult to clean, and secondly, since the cutting wires are strung from side to side across the bow and usually formed, initially at least, of a continuous length, a break in any particular strand will loosen the entire cutting wire. The usual method of repairing a cutting knife in which a cutting wire is broken is to solder it to the frame adjacent the point of break. Over an extended period of use it is not uncommon to see a cheese cutter in which substantially the entire sides are covered by solder which has been occasioned during previous use through breakage of one or more of the cutting wires. This likewise presents a further sanitation problem and is unsightly in appearance.

The cutting tool of the present invention completely overcomes these objections to the present cutting devices. It is contemplated by the present invention to individually secure the respective cutting wires to its respective side frame so that a break in any individual cutting wires will not affect the adjacent cutting wires. It is further contemplated to provide easy means for securing the respective cutting wires to its respective frame members so that the wires, in the event of breakage, can be easily replaced. Because of this unique method of construction, it is possible to employ cutting wires of larger size than those previously employed, since the size of present day cutting wires is, to a large extent, dictated by the capability of stringing such wires. A most important aspect and benefit of the present cheese cutter is the fact that the method of attachment of the cutting wires at is respecive ends to the frame members is such that there are no depressions, cavities, protrusions, or any other trap for bacteria or food particles which will present a sanitation problem.

It is therefore a primary object of the present invention to generally improve cheese cutters.

A further object of the present invention is to provide a cheese cutter which consists of a frame and individual cutting wires individually fixed with the respective ends of the frame for holding the respective cutting wires tautly and in cutting relationship across the frame.

Yet another object of the present invention is to provide a method for securing one end of a wire in a framework.

A further object of the present invention is to provide a method of individually fixing the respective ends of individual cutting wires of a cheese knife to the respective side members so that in the event of breakage of one wire, the remaining wires will not be affected, and the broken wire can be easily replaced.

Other objects and advantages of the present invention will be readily apparent to those skilled in the art upon perusal of the following description and drawings in which:

FIG. 1 is a plan view of a cutting tool embodying the principles of the present invention.

FIG. 2 is an end view of the cutting tool disclosed in FIG. 1.

FIG. 3 is a sectional view of a portion of the cutting tool disclosed in FIG. 1, slightly enlarged.

FIG. 4 is a cross-sectional view taken on the line 4—4 of FIG. 3.

Referring to the drawings, a cheese cutter embodying the principles of the present invention is broadly identified as 10 and comprises a frame 11 to which is suitably affixed a handle 12, the frame 11 being preferably rectangular in shape and preferably formed of suitable sanitary material, such as stainless steel, and comprising a pair of side members 13 and longitudinal end members 14, a center reinforcing web 15 extending between the side members 13 for strengthening purposes. A plurality of cutting wires 16 are fixed adjacent their respective ends to the respective side members 13 so as to extend across the frame in substantially taut and parallel relationship with respect to the longitudinal frame members 14 and the intermediate member 15.

As previously suggested, the individual cutting wires are fixed adjacent their respective ends to the side members 13 of the frame. More specifically, and referring to FIGS. 3 and 4, each of the side frame members 13 has a plurality of equally spaced openings 17 formed therein. Each opening 17 comprises an opening 18 of greater diameter than an opening 19 and an interconnecting opening 20 of truncated configuration. One end of a cutting wire 16 is inserted through the opening 17 in the manner disclosed in sequence A of FIG. 3. A retainer plug 21 is then inserted in the opening 18, said plug having a coned end portion 22 which extends into the opening 19. The retainer plug 21 is formed of metal material of less hardness than the frame 11 of the cutting tool, for example, the frame 11 being preferably formed of stainless steel and the retainer plugs 21 being preferably formed of aluminum. The cylindrical portion 23 of the plug 21 is substantially the same diameter as the diameter of opening 18 so that the plug 21 has to be forced into the opening 17 and fits tightly therein in the manner disclosed in sequence B of FIG. 3. To securely fix the end of the cutting wire 16 in the opening in the manner disclosed in sequence C of FIG. 3, the plug 21 is forced into the opening until the sides of the cone portion 22 seat tightly against the truncated sides of the opening 20. When in this position the end of the portion 22 will extend out of the opening 19, and a portion of the cylindrical portion 23 will extend out of the opening 18. This portion of the cylindrical portion 23 along with that portion of the wire extending beyond the side member 13 are then filed or shaved or cut until they are flush with the frame. The cone portion protruding out of the opening 19 is squeezed with a suitable tool to the extent that sufficient material is forced to flow into the opening 19 to completely fill the opening. The remaining material is then filed or suitably shaved or cut flush with the inside of the frame. It will be appreciated that since the plug is formed of material substantially softer than the material constituting the frame, that the material will flow around the cutting wire 16 and thereby not only completely fill the opening 17, but firmly grip the wire 16. It will also be appreciated that since these retainer plugs completely fill the respective opening 17, and since the excess material at both ends is filed, shaved, or cut flush with the respective frame surfaces, that no cavities or traps are present which could possibly present a sanitary problem.

It will be appreciated, of course, that each end of each cutting wire 16 is fixed in its respective frame member by a retainer plug 21 and the wire is held at its desired tautness. Therefore, the breakage of any individual cutting wire will not affect any adjacent cutting wire, and the individual cutting wires can be easily replaced by removing the old plugs, inserting a new cutting wire in the respective openings and then inserting new plugs in the manner above described. Also, since the cutting wires are not strung in the manner described above with respect to present cheese cutters, the cutting wires can be of substantially greater diameter than those presently capable of being used. Therefore, it is now possible to use a size wire which is not subject to breakage as compared to cutting wires presently employed in present cheese cutters.

In conclusion, it will be appreciated that the present invention contemplates a cheese cutter having cutting wires which are individually fixed to their respective frame elements and means for individually fixing the respective ends of these wires to the respective frame elements which present no cavities or traps which would occasion sanitation problems. Since the cutting wires are individually fixed to the frame by the retainer plugs 21, they can also be individually replaced without affecting the adjacent cutting wires, and since the cutting wires are formed of individual lengths, they can be formed of a size wire heretofore not used.

What is claimed is:

1. A method of making a sanitary attachment of a cutting wire to a frame member having an opening formed therein comprising the steps of extending the end of said wire through said opening, force fitting a retainer plug in said opening so that it protrudes from both ends of said opening, then compressing said retainer plug until it flows sufficiently to completely fill said opening and securely fix said cutting wire therein, and then removing the excess material of said retainer plug so that it is flush with the sides of the frame member.

2. A frame member, said member having an opening formed therein extending through the thickness thereof, a cutting wire extending through said opening, and a retainer plug force-fitted in said opening, said plug being formed of material softer than the material of said member and being compressed sufficiently to cause said plug to flow around said member and completely fill said opening, said plug being flush with the side surfaces of said member.

3. A cheese cutter comprising a pair of spaced side members, a plurality of cutting wires extending between said side members, each of said side members having a plurality of openings formed therein, each of said openings having a portion of greater diameter, a portion of smaller diameter and an interconnecting portion having a truncated configuration, the opposite ends of each of said cutting wires extending through oppositely disposed openings, and a retainer plug force-fitted into each of said openings, said retainer plugs being formed of material softer than the material of said cutting wires and said side members, each of said retainer plugs having a cylindrical portion and a cone portion and each of said retainer plugs being compressed sufficiently to cause the material thereof to flow around its respective wire and completely fill its respective opening, the ends of each of said plugs being flush with the surfaces of its side member.

References Cited in the file of this patent
UNITED STATES PATENTS

| | | |
|---|---|---|
| 2,111,035 | Winslow | Mar. 15, 1938 |
| 2,114,277 | Bloomfield | Apr. 19, 1938 |
| 2,637,895 | Blaton | May 12, 1953 |